United States Patent [19]

Barrera

[11] Patent Number: 5,197,268

[45] Date of Patent: Mar. 30, 1993

[54] MULCHING BLADE

[76] Inventor: Severo Barrera, 15961 Woodbine Cir., Mundelein, Ill. 60060

[21] Appl. No.: 942,721

[22] Filed: Sep. 2, 1992

Related U.S. Application Data

[63] Continuation-in-part of Ser. No. 800,214, Nov. 29, 1991, abandoned.

[51] Int. Cl.$^5$ ............................................. A01D 34/68
[52] U.S. Cl. ........................................ 56/255; 56/295
[58] Field of Search .......... 56/255, 295, 17.5, DIG. 20

[56] References Cited

U.S. PATENT DOCUMENTS

| | | | |
|---|---|---|---|
| 3,214,896 | 11/1965 | Watkins et al. | 56/295 |
| 3,998,037 | 12/1976 | Deans et al. | 56/295 |
| 4,083,166 | 4/1978 | Haas | 56/255 X |
| 4,368,610 | 1/1983 | Aono | 56/295 |
| 4,527,382 | 7/2985 | Aono | 56/295 |

Primary Examiner—Terry Lee Melius
Attorney, Agent, or Firm—Douglas B. White

[57] ABSTRACT

A mulching blade for a mower is described herein. In one embodiment shredding teeth are arranged about a bulging central portion of the blade (or a separate disk mounted with the blade). During mowing these teeth shred grass and leaves trapped within the mower housing, thereby using the housing and air flow generated by the blade to bring the debris into mulching contact with the teeth rotating at high speed within the housing.

1 Claim, 3 Drawing Sheets

FIG. 2
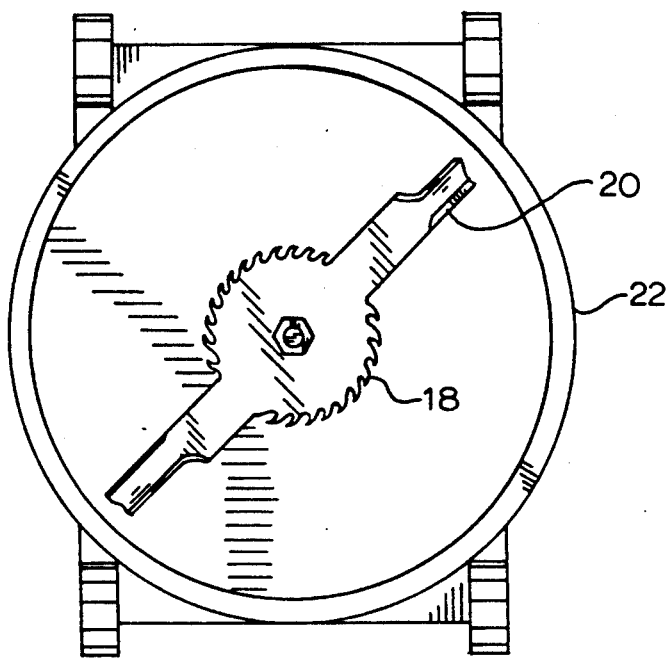
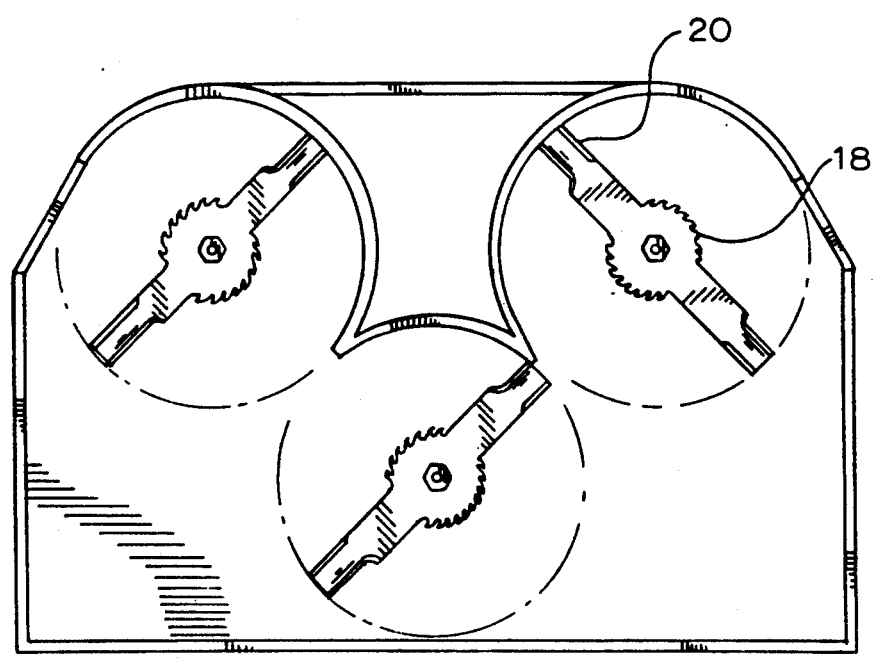
FIG. 3

MULCHING BLADE

This is a continuation-in-part of application Ser. No. 07/800,214, now abandoned.

BACKGROUND OF THE INVENTION

1. Field of the Invention

The present invention relates generally to machines used to mow lawns. More particularly, this invention relates to an improvement in the mowing blade to provide simultaneous mulching of leaves and grass.

2. Description of the Prior Art

Prior art mulching techniques have generally employed attachments to mowers which utilize separate cutting and chopping apparatus to achieve this mulching. Typical of these devices is U.S. Pat. No. 5,020,309: a frame mounted chopping device is attached to a lawn mower to accept cut material from the mower and to produce a mulched product. To date an effective combination mulching and mowing blade has not been presented which efficiently accomplishes the mulching during the mowing.

SUMMARY OF THE INVENTION

The present invention achieves the mulching during mowing by use of an improved blade configuration. In one embodiment this blade employs a series of teeth along the edges of the mowing blade. In a second embodiment the teeth are arranged about a bulging central portion of the blade (or a separate disk mounted with the blade). During mowing these teeth shred grass and leaves trapped within the mower housing, thereby using the housing and the air flow generated by the blade to bring the debris into mulching contact with the teeth rotating at high speed within the housing.

BRIEF DESCRIPTION OF THE DRAWINGS

FIG. 2 is a bottom view of the lawn mower of FIG. 1.

FIG. 3 is a bottom view of a triple blade riding mower

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
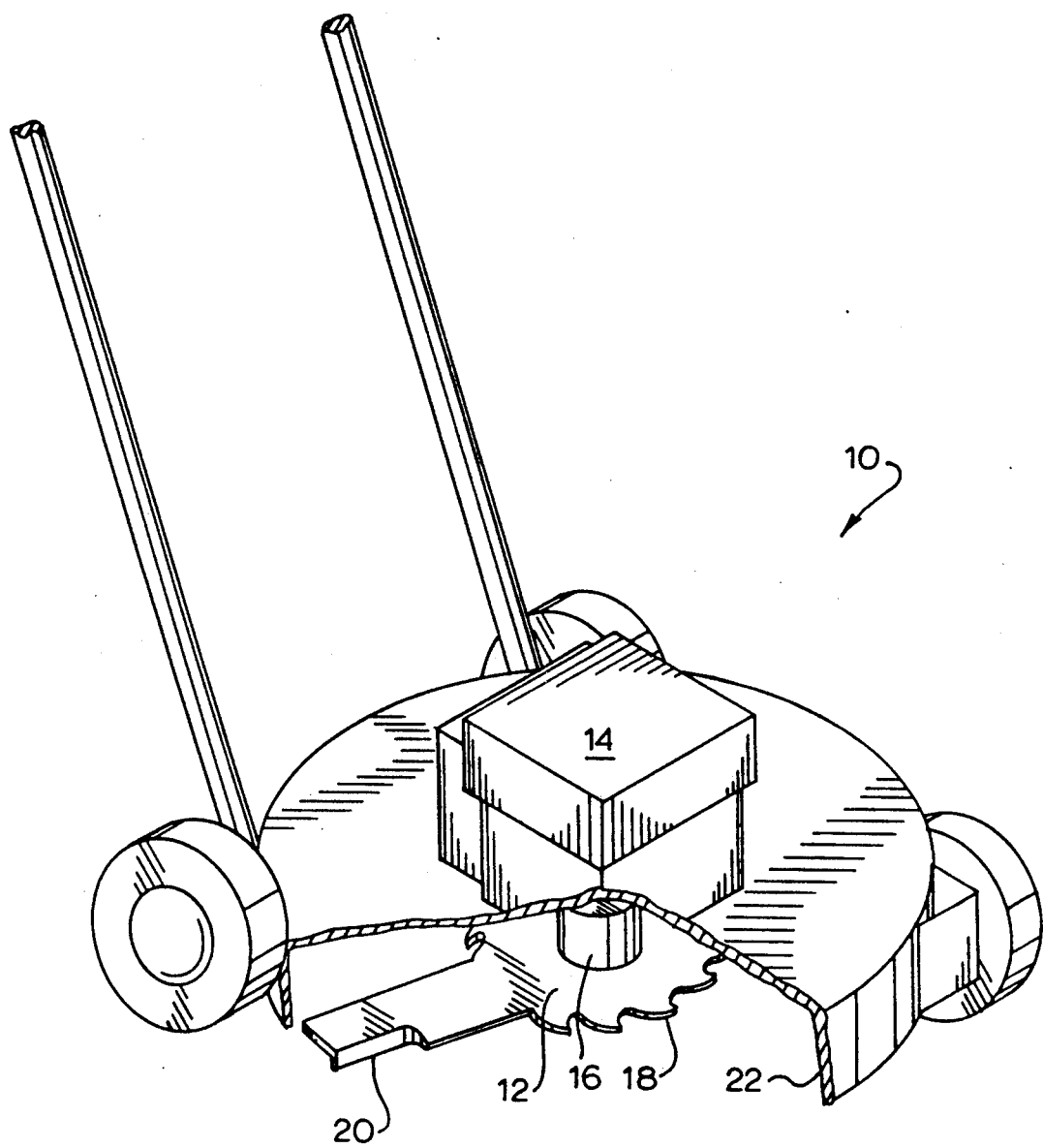
FIG. 1 is a perspective view of a lawn mowing machine employing the improved mulching blade of the present invention.

Turning first to FIG. 1 there is shown a traditional lawn mower 10 employing a mulching blade 12 in accordance with the present invention. The mower includes a motor 14 driving a rotary shaft 16. Mounted on this shaft is the mulching blade 12 presenting a series of shredding teeth 18 in addition to the traditional grass cutting blade edges 20. This blade rotates with the rotary shaft within an enclosure 22 formed by the mower housing.

Referring now to FIGS. 2 and 3, this mulching blade 12 exhibits grass cutting edges 20 at its extremities, but carries a plurality of teeth 18 along the periphery of its central portion. In the preferred embodiment this central portion is defined by a bulging, enlarged diameter having teeth positioned along its edge. This central portion is formed as either a disk-like center part of the blade, or a separate disk-like attachment to the mowing blade. Moreover, this mulching blade may be used with any mower from the popular single blade version (FIG. 2) to the triple blade riding mower (FIG. 3). In both cases, the mower housing surrounding the blade contains the debris for shredding by the teeth, and air flow within the housing cycles the debris past the shredding teeth.

Figure 5:
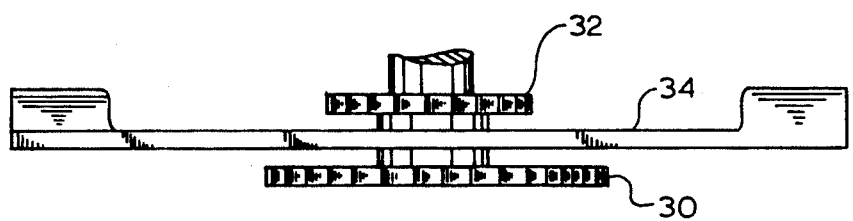
FIG. 5 is a side view of a third embodiment of the mulching blade of the present invention.
Figure 4:
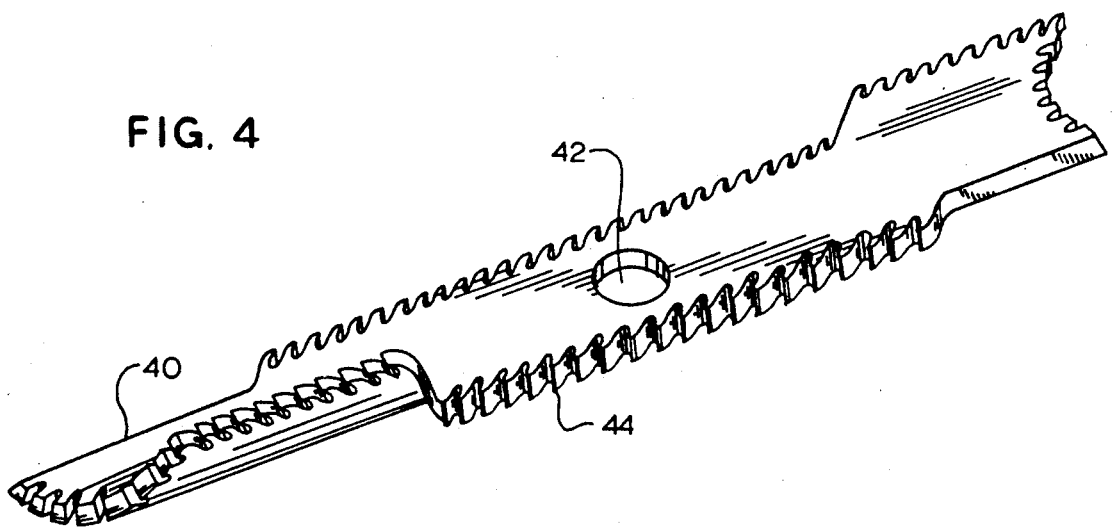
FIG. 4 is a perspective view of a second embodiment of the mulching blade of the present invention.

Improved performance is further attainable by separating the central disk portion from the cutting blade and spacing it upwardly of the blade, closer to the housing (FIG. 5). This improves the air flow, increasing the mulching contact between the debris and the teeth, and places the mulching teeth closer to the housing where there is a higher concentration of debris. As before, this central portion of the blade carrying the mulching teeth may be either integral with the mowing blade or a detached part.

In yet a further feature of the invention (FIG. 5), dual disks 30 and 32 are mounted in spaced relation to the cutting blade 35. Additionally, the upper disk 32 (closest to the mower housing) is preferably of a smaller diameter to facilitate the movement of the debris to the mulching teeth. As before, both disks present teeth 36 and 38 to perform the mulching.

Performance is dependant upon maintaining proper air flow to carry the debris upwardly. When using a typical 21" mower blade (FIG. 1) the center bulging portion is preferably 8" or less, to maintain adequate air flow. On a larger mower using three 16½" blades (FIG. 3), the central portion is preferably 9" or less; and when a double center portion is used (FIG. 5), the top blade 32 is preferably 6" or less. In view of these parameters, it has been found that the diameter of the center blade, for the single center blade embodiment, should not exceed 55% of the length of the elongated cutting blade to function properly. When the double center blade embodiment is employed, the upper blade should preferably be 70% or less of the diameter of the lower blade to facilitate proper air flow.

From the foregoing description, it will be apparent that modifications can be made to the apparatus and method for using same without departing from the teachings of the present invention. Accordingly, the scope of the invention is only to be limited as necessitated by the accompanying claims.

I claim:

1. Mulching apparatus for a mower having a rotary driven shaft comprising:
    an elongated cutting member adapted to be mounted to the rotary driven shaft of the mower;
    a primary central disk member having a plurality of mulching teeth defined along the peripheral edge thereof and spaced below said elongated cutting members, wherein the diameter of said central portion is less than 55% of the length of said elongated cutting member; and
    a secondary disk member having mulching teeth defined on the periphery thereof mounted above said cutting member, and wherein the diameter of said secondary disk member is less than 70% of the diameter of said primary disk member.

* * * * *